US010822233B2

United States Patent
Margiott et al.

(10) Patent No.: US 10,822,233 B2
(45) Date of Patent: Nov. 3, 2020

(54) REFORMER INCLUDING CATALYST IN AN INLET PLENUM

(71) Applicant: DOOSAN FUEL CELL AMERICA, INC., South Windsor, CT (US)

(72) Inventors: Paul Margiott, South Windsor, CT (US); James Davies, Glastonbury, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 245 days.

(21) Appl. No.: 15/977,549

(22) Filed: May 11, 2018

(65) Prior Publication Data
US 2019/0345030 A1    Nov. 14, 2019

(51) Int. Cl.
*C01B 3/38* (2006.01)
*H01M 8/0612* (2016.01)

(52) U.S. Cl.
CPC ............ *C01B 3/38* (2013.01); *H01M 8/0625* (2013.01); *C01B 2203/0227* (2013.01); *C01B 2203/1005* (2013.01); *C01B 2203/1058* (2013.01); *C01B 2203/1241* (2013.01)

(58) Field of Classification Search
CPC ...................................................... C01B 3/38
See application file for complete search history.

(56) References Cited

U.S. PATENT DOCUMENTS

| 5,366,819 A * | 11/1994 | Hartvigsen ............. C01B 3/384 429/423 |
| 5,433,841 A * | 7/1995 | Ichikawa ................. B01J 23/50 208/134 |
| 5,763,114 A * | 6/1998 | Khandkar .............. B01J 8/0085 429/423 |
| 5,811,065 A | 9/1998 | Sterenberg |
| 6,221,320 B1 * | 4/2001 | Nagaoka ................ B01J 8/0207 422/218 |
| 6,296,814 B1 | 10/2001 | Bonk et al. |
| 6,492,050 B1 | 12/2002 | Sammes |
| 6,793,698 B1 * | 9/2004 | Sanger ................... B01J 8/0465 422/200 |
| 8,057,944 B2 | 11/2011 | Venkataraman |
| 8,287,825 B1 * | 10/2012 | Namazian ................ C01B 3/34 422/626 |
| 8,349,214 B1 | 1/2013 | Kelly et al. |
| 8,920,997 B2 | 12/2014 | Venkataraman |
| 9,216,396 B2 | 12/2015 | Khinkis et al. |
| 2003/0105172 A1 * | 6/2003 | Bowe ..................... B01J 8/0214 518/728 |
| 2004/0187386 A1 * | 9/2004 | Wangerow ............. B01J 8/0449 48/198.3 |
| 2010/0005960 A1 * | 1/2010 | Noda ...................... C01B 3/501 95/56 |
| 2010/0086824 A1 * | 4/2010 | Homel ................. H01M 4/8626 429/406 |
| 2010/0217039 A1 * | 8/2010 | Hassan .................. B01J 12/007 562/519 |
| 2015/0111121 A1 * | 4/2015 | Weingaertner ...... H01M 8/0618 429/425 |
| 2019/0275494 A1 * | 9/2019 | Ulber ..................... B01J 19/325 |

* cited by examiner

*Primary Examiner* — Matthew J Merkling
(74) *Attorney, Agent, or Firm* — Carlson, Gaskey & Olds

(57) ABSTRACT

An illustrative example reformer includes a housing having an inlet plenum, a reforming section, and an outlet. The inlet plenum includes a catalyst situated where a source fluid passing through the inlet plenum will be exposed to the catalyst prior to entering the reforming section.

12 Claims, 2 Drawing Sheets

REFORMER INCLUDING CATALYST IN AN INLET PLENUM

BACKGROUND

Fuel cells produce electricity based on an electrochemical reaction. Some fuel cells include a polymer electrolyte membrane (PEM) while others utilize a liquid electrolyte, such as phosphoric acid. In either configuration, the fuel cells utilize reactants for producing electricity. The reactants often are oxygen, which can be obtained from air, and hydrogen, which can be obtained by reforming a hydrocarbon gas in a reformer.

Over the years various advancements and improvements in reformers have become available. For example, it was necessary to be able to make reformers compact and economical enough to include them as part of a fuel cell power plant. Since then those skilled in the art have sought various ways to improve upon different aspects of reformers, such as their reliability and efficiency. The desire for further improvements continues as part of efforts to make fuel cells more economical for a wider range of applications.

SUMMARY

An illustrative example reformer includes a housing having an inlet plenum, a reforming section, and an outlet. The inlet plenum includes a catalyst situated where a source fluid passing through the inlet plenum will be exposed to the catalyst prior to entering the reforming section.

In an example embodiment having one or more features of the reformer of the previous paragraph, the inlet plenum includes a mesh container and the catalyst is in the mesh container.

In an example embodiment having one or more features of the reformer of any of the previous paragraphs, the mesh container comprises a tube of mesh material.

In an example embodiment having one or more features of the reformer of any of the previous paragraphs, the tube comprises a cylinder having coaxial inner and outer mesh walls and the catalyst is situated between the inner and outer mesh walls.

In an example embodiment having one or more features of the reformer of any of the previous paragraphs, the catalyst comprises a pre-reformer catalyst.

In an example embodiment having one or more features of the reformer of any of the previous paragraphs, the catalyst comprises nickel.

An illustrative example method of reforming a source fluid includes directing the source fluid through an inlet plenum of a reformer, exposing at least some of the source fluid to a catalyst in the inlet plenum, and reforming the exposed source fluid after it exits the inlet plenum.

In an example embodiment having one or more features of the method of the previous paragraph, the catalyst comprises a pre-reformer catalyst.

In an example embodiment having one or more features of the method of any of the previous paragraphs, the catalyst comprises nickel.

In an example embodiment having one or more features of the method of any of the previous paragraphs, the catalyst in the inlet plenum is situated in a mesh container and exposing the source fluid to the catalyst comprises directing the source fluid into contact with the mesh container.

In an example embodiment having one or more features of the method of any of the previous paragraphs, exposing the source fluid to the catalyst comprises directing the source fluid at least partially through the mesh container.

In an example embodiment having one or more features of the method of any of the previous paragraphs, the source fluid comprises a hydrocarbon.

In an example embodiment having one or more features of the method of any of the previous paragraphs, the source fluid comprises at least one of natural gas, pure methane, ethane, propane or liquefied petroleum gas.

In an example embodiment having one or more features of the method of any of the previous paragraphs, the source fluid comprises natural gas.

Various features and advantages of at least one disclosed example embodiment will become apparent to those skilled in the art from the following detailed description. The drawings that accompany the detailed description can be briefly described as follows.

DETAILED DESCRIPTION

Figure 1:
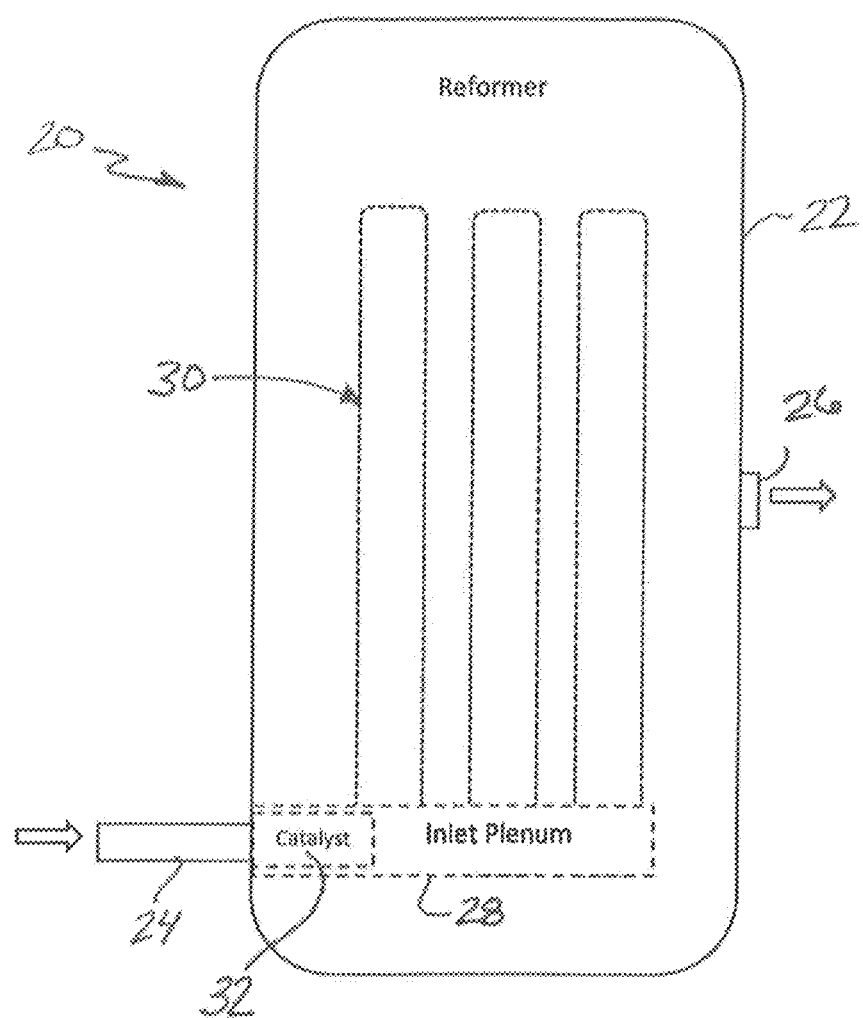
FIG. 1 schematically illustrates selected aspects of a reformer designed according to an embodiment of this invention.

FIG. 1 schematically shows selected aspects of a reformer 20. A housing 22 includes an inlet 24 and an outlet 26. The reformer 20 is useful for reforming a source fluid to produce useful products, such as hydrogen. The source fluid may be any source of the intended end product. The illustrated example reformer 20 is well suited for reforming a hydrocarbon source fluid to produce hydrogen for use in a fuel cell. The hydrocarbon source fluid may comprise, for example, natural gas, pure methane, ethane, propane or liquified petroleum gas (LPG). For discussion purposes, natural gas will be used as an example source fluid in the following description.

Natural gas enters the housing 22 through the inlet 24 and flows into an inlet plenum 28 prior to entering a reforming section 30 that includes catalyst tubes that operate in a known manner. Reformed gas exits the housing through the outlet 26. Other aspects of the reformer 20, such as a burner, are not shown as they are generally known in the art.

The inlet plenum 28 contains a catalyst 32 that is situated in the inlet plenum 28 where at least some of the natural gas in the inlet plenum is exposed to the catalyst 32 before the gas enters the reforming section 30. Exposing natural gas to the catalyst 32 in the inlet plenum 28 increases the efficiency of the reformer 20.

In some embodiments the catalyst 32 comprises nickel. An example embodiment includes a catalyst material used in pre-reforming devices that are designed to process propane. The catalyst 32 is such embodiments can be referred to as a pre-reformer catalyst.

Figure 2:
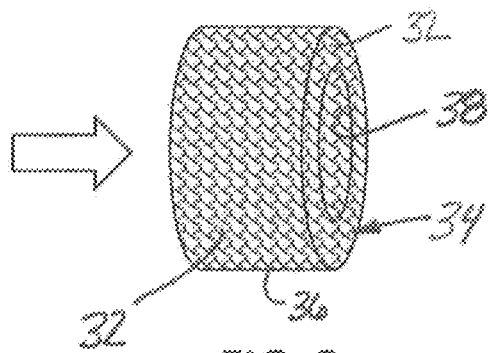
FIG. 2 schematically illustrates an example mesh container for holding a catalyst in an inlet plenum designed according to an embodiment of this invention.

Some embodiments include the catalyst 32 in a container within the inlet plenum 28. FIG. 2 shows one example container 34. In this embodiment, the container 34 comprises a perforated screen or mesh material. The catalyst 32 is situated in the container 34 and at least some of the natural gas that flows through the inlet plenum 28 passes along or at least partially through the container 34 where such gas is exposed to the catalyst 32.

In the example of FIG. 2, the container 34 is generally cylindrical and has an outer wall 36 that is coaxial with an inner wall 38. The natural gas may be exposed to the catalyst 32 in the container 34 by following at least one path. For example, the natural gas may pass through the central opening along the inner wall 38 of the container 34, along the exterior of the container 34 along the outer wall 36, through the container between the inner wall 38 and the outer wall 36, or a combination of such paths.

The example container 34 of FIG. 2 provides a convenient way to support the catalyst 32 within the inlet plenum 28 where natural gas will be exposed to the catalyst 32 prior to leaving the inlet plenum 28 and entering the reforming section 30.

Figure 3:
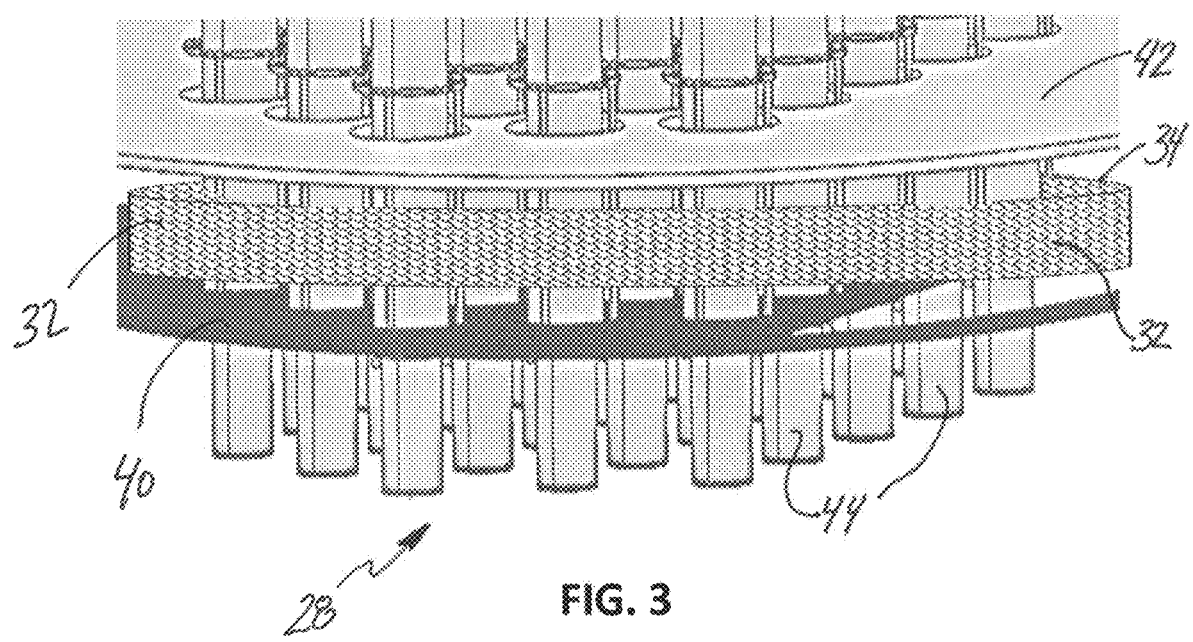
FIG. 3 schematically illustrates an example arrangement of an inlet plenum containing a catalyst according to an embodiment of this invention.

FIG. 3 illustrates an example arrangement of the container 34 within an example plenum 28. FIG. 3 shows the container 34 situated between a lower plenum plate 40 and an upper plenum plate 42. The container 34 containing the catalyst 32 surrounds catalyst tubes 44 in this embodiment. As the source fluid, such as natural gas, flows into the plenum 28, at least some of the source fluid will come in contact with the catalyst 32 that is exposed through the mesh of the container 34. In some cases, the source fluid will at least partially flow through the container 34 and contact the catalyst 32. High temperatures at the lower plenum plate 40 and the upper plenum plate 42 drive the reaction in the catalyst 32.

In another example arrangement the catalyst 32 occupies at least some of what otherwise would have been open space among the catalyst tubes 44 without being in a separate container 34. In one such embodiment the catalyst 32 effectively fills some of the space in the inlet plenum 28 in a manner that still allows the source fluid to flow through and among the catalyst tubes 44.

The pre-reforming catalyst 32 utilizes heat in the inlet plenum 28 and effectively converts what otherwise would be waste heat into useful heat that assists in reacting the incoming source fluid faster. This provides an improvement in reformer performance and better utilization of the source fluid.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A reformer, comprising:
a housing including an inlet and an outlet;
a reforming section in the housing;
an inlet plenum in the housing between the inlet and the reforming section, the inlet plenum including a mesh container; and
a catalyst situated in the mesh container in the inlet plenum where a source fluid passing through the inlet plenum will be exposed to the catalyst prior to entering the reforming section.

2. The reformer of claim 1, wherein the mesh container comprises a tube of mesh material.

3. The reformer of claim 2, wherein the tube comprises a cylinder having coaxial inner and outer mesh walls and the catalyst is situated between the inner and outer mesh walls.

4. The reformer of claim 1, wherein the catalyst comprises a pre-reformer catalyst.

5. The reformer of claim 1, wherein the catalyst comprises nickel.

6. A method of reforming a source fluid, the method comprising:
directing the source fluid through an inlet plenum of a reformer;
exposing at least some of the source fluid to a catalyst in the inlet plenum; and
reforming the exposed source fluid after it exits the inlet plenum,
wherein, the catalyst in the inlet plenum is situated in a mesh container and exposing the source fluid to the catalyst comprises directing the source fluid into contact with the mesh container.

7. The method of claim 6, wherein, the catalyst comprises a pre-reformer catalyst.

8. The method of claim 6, wherein, the catalyst comprises nickel.

9. The method of claim 6, wherein, exposing the source fluid to the catalyst comprises directing the source fluid at least partially through the mesh container.

10. The method of claim 6, wherein the source fluid comprises a hydrocarbon.

11. The method of claim 10, wherein the source fluid comprises at least one of natural gas, pure methane, ethane, propane or liquefied petroleum gas.

12. The method of claim 6, wherein the source fluid comprises natural gas.

* * * * *